UNITED STATES PATENT OFFICE.

BENJAMIN J. GUDGE, OF WILKINSBURG, PENNSYLVANIA, ASSIGNOR TO WESTINGHOUSE ELECTRIC AND MANUFACTURING COMPANY, A CORPORATION OF PENNSYLVANIA.

METHOD OF PREPARING RESINOUS COMPOSITIONS.

1,299,706.     Specification of Letters Patent.     Patented Apr. 8, 1919.

No Drawing.     Application filed November 7, 1917. Serial No. 200,693.

*To all whom it may concern:*

Be it known that I, BENJAMIN J. GUDGE, a citizen of the United States, and a resident of Wilkinsburg, in the county of Allegheny and State of Pennsylvania, have invented a new and useful Improvement in Methods of Preparing Resinous Compositions, of which the following is a specification.

My invention relates to the preparation of molding compositions and particularly to the class of molding compositions having resinous binders, and it has for an object to provide for a more thorough mixture of the filler and binder materials.

A further object is to enable the binder to be so comminuted that the particles will adhere properly to the adjacent particles of filler material.

In practising my invention, I prefer to use such inert fillers as asbestos, wood flour, powdered silica and the like, united into a solid mass by certain resinous binders, but any other suitable filler may be employed in lieu of those mentioned above.

The binders which I prefer to employ are resinous products of the partial or complete polymerization of certain aromatic carbon compounds, particularly indene, cumaron and their isomers, as set forth in the copending application of James P. A. McCoy, Serial No. 20752, filed April 12, 1915, and assigned to the Westinghouse Electric & Manufacturing Company. Both indene and cumaron are produced, as such, in the fractional distillation of coal tar, and they may also be prepared synthetically. Whether prepared by distillation from coal tar, or synthetically, they are readily polymerized by means of sulfuric acid which, when added to a solution of either or both of these substances, forms a partly polymerized resinous material. In the case of the coal-tar distillation, this material is a mixture of paraindene and paracumaron. The partly polymerized resins are readily soluble in many of the usual organic solvents including coal-tar oils, such as anthracene oil.

Some difficulty has been found in incorporating asbestos and similar filling materials with cumaron-indene resins to produce a homogeneous mass. When solvents are used, it is difficult to remove them from the finished material and, when the materials are mixed by grinding without solvents, the heat evolved in the grinding and mixing is sufficient to cause partial melting of the resin and the consequent formation of granules which will adhere imperfectly to the filler material. When a ball mill is used to grind resinous material, a ball striking a particle of the material will so flatten it out that the particle readily adheres to other particles or to the wall of the ball mill.

According to one form of my invention, the resins are ground in water, thus forming a thin emulsion-like liquid. This may be accomplished by tumbling the resins with water in a ball mill for about three to five hours. The asbestos to be used as the filler is introduced into this liquid, the mass is thoroughly mixed and then drained and dried. It is found that the water may be easily and completely removed, leaving a well-mixed mass of asbestos and binder ready for molding.

The water used in the grinding process serves to prevent heating of the individual particles to the melting point and also serves to cover them with a film which prevents adhesion of the particles to each other.

According to another form of my invention, the resinous material is dissolved in the least possible amount of a volatile solvent. The thick pasty mixture obtained in this way is tumbled with water in a ball mill, in the manner previously described in connection with the form of my invention employing undissolved resin. Filler material is now incorporated into the emulsion of resinous material and water and, after the mass is thoroughly mixed, it may be boiled in order to drive off the volatile solvent. The vapors of the solvent may be trapped and the solvent may be recovered by any well-known means. The mass of molding material is now drained and dried. This mode of treatment permits of the use of very small quantities of solvent.

It will be understood that the word "water", as used in describing my invention and in the claims, comprises pure or ordinarily pure water and does not include water to which other agents have been added.

This method is of general application, as regards the fillers and binders employed and as regards the uses to which the molding material is to be applied. One of the most important uses for this material is in the manufacture of caps and cones for trolley hangers which may be produced more cheaply than the composite caps and cones heretofore made and which are mechanically and electrically stronger than such prior articles.

It is obvious that the particular materials and operations set forth may be variously modified in the art to which my invention pertains without departing from the spirit of the invention. It is, therefore, to be understood that my invention comprehends all such modifications, changes and adaptations as fall within the scope of the appended claims.

I claim as my invention:

1. The step in the process of preparing molding compositions which comprises introducing a resinous binding material into a body of water and comminuting said resinous material therein.

2. The process of preparing molding compositions which comprises comminuting a resinous binder in water substantially free of solid matter and mixing a filler therewith.

3. The process of preparing molding compositions comprising comminuting a binder material in a liquid which is substantially free of solid matter and in which it is insoluble, and mixing with it a filler substance.

4. The process of preparing molding compositions which consists in finely dividing a binder material in the presence of a fluid in which it is insoluble, and which is substantially free of solid matter, incorporating a quantity of finely divided filler into the mixture produced thereby, and eliminating said fluid from the resulting mass.

5. The process of preparing molding compositions which consists in tumbling a resinous binder material in a ball mill, in the presence of water substantially free of solid matter, incorporating a finely divided filler material into the mixture, and drying the resultant mass.

6. The process of preparing molding compositions which consists in grinding, in water, a resinous mixture containing paraindene and paracumaron, incorporating a quantity of finely divided filler material therein and drying the resultant mass.

7. A molding composition consisting of a resinous binder material, ground in water substantially free of solid matter, and an inert filler substance incorporated therewith.

In testimony whereof, I have hereunto subscribed my name this 31st day of Oct. 1917.

BENJ. J. GUDGE.